United States Patent [19]

Sawada et al.

[11] Patent Number: 6,043,851
[45] Date of Patent: Mar. 28, 2000

[54] IMAGE AND SOUND SYNCHRONIZING REPRODUCTION APPARATUS AND METHOD OF THE SAME

[75] Inventors: Hideki Sawada; Takashi Sameshima; Masaru Terashima; Mitsumasa Tanaka, all of Tokyo, Japan

[73] Assignee: NEC Corporation, Tokyo, Japan

[21] Appl. No.: 09/006,658

[22] Filed: Jan. 13, 1998

[30] Foreign Application Priority Data

Jan. 13, 1997 [JP] Japan .................................... 9-003851

[51] Int. Cl.[7] ................................................. H04N 9/475
[52] U.S. Cl. .......................... 348/512; 348/513; 348/515
[58] Field of Search .................................. 348/500, 501, 348/512, 513, 515, 423, 845.3; H04N 9/475

[56] References Cited

FOREIGN PATENT DOCUMENTS

7-50838  2/1995  Japan .
8-251543  9/1996  Japan .

*Primary Examiner*—Sherrie Hsia
*Attorney, Agent, or Firm*—Foley & Lardner

[57] ABSTRACT

An image and sound synchronizing reproduction apparatus includes a reference time calculation circuit for calculating a reference time in response to a data amount of decoded sound data, a delay detecting circuit calculating number of image frames to be processed practically in the decoding process in response to the reference time and comparing the number of image frames with number of frames practically processed in the decoding process, for detecting a delay of image decoding process, a frame-removing control circuit for performing a discriminating process of frames to be omitted the decoding process in response to the number of delay frames detected by the delay detecting circuit, and an image data input control circuit for performing an omission to read compressed image data corresponding to the frames discriminated by the frame-removing control circuit, controlling finely the image and sound synchronizing reproduction regardless of the structure of compressing coded data.

20 Claims, 5 Drawing Sheets

FIG.5 synchronizing control number of frames between key frames

IMAGE AND SOUND SYNCHRONIZING REPRODUCTION APPARATUS AND METHOD OF THE SAME

BACKGROUND OF THE INVENTION

1. Field of the Invention

The present invention relates to a synchronizing reproduction apparatus and a method of the same of image and sound data both coded in digital compression.

2. Description of the Related Art

In an image and sound synchronizing reproduction apparatus for decoding image and sound data coded in digital compression and reproducing both, all image and sound data can be reproduced continuously in the case where the data processing performance of reproducing apparatus is high enough. However, when the performance thereof is low, the image and sound data cannot be reproduced in real-time or in reproducing speeds as those originally have, since the times for data transfer and decoding process are required to some extent. That is, there arise problems that the image becomes a slow motion and the sound is reproduced intermittently.

Practically, since the congruity of the intermittent sound is higher than that of its image, the sound is processed in priority rather than the image in general so that the sound can be reproduced continuously. Thereafter, a process removed the sound reproducing process from the entire process is assigned to the image reproducing process.

At this time, since there arises problem that the content of image are shifted from that of sound unless the image is synchronized with the sound (or matched reproducing positions with each other), it is required to omit (or remove a frame) the decoding process of some frames in the image reproducing process.

As related to the synchronizing reproduction system of image and sound described above, there has been a system disclosed in a laid-open Japanese patent application No. Hei-7-50838. This system omits to read one compressed image data corresponding to the number of delay frames of the image and the other compressed image data which immediately follows the one compressed image data as far as a frame-in coded image without requiring a reference frame, at a time of making sure out of the synchronism in the case of arising it between the image and sound in a decoding device, as described above. That is, this means that the delay in image process is restored by removing frame.

In the coding systems for compressed image data there is one system for the frame-in coded image (hereinafter referred to as I-frame) without requiring a reference frame as described above, another system for a inter frame forward-directional predicting coded image (hereinafter referred to as P-frame) required a reference frame in the decoding and becoming a reference frame itself, and further another system for a inter frame bi-directional predicting coded image (hereinafter referred to as B-frame) required a reference frame in the decoding and not becoming a reference frame itself.

Assuming that the decoding for the I-frame and P-frame is omitted, the rest of those are decoded as a reference frame, but the succeeding P-frame and B-frame cannot be decoded correctly.

In the related art described above, when arising the delay of image process, since the decoding for the one compressed image data of the number of delay frames and the other compressed image data up to the I-frame immediately after the one, are omitted regardless of its coded system of the compressed image data, for example, when the data structure is of low frequency of appearing the I-frame, the number of frames to be practically removed becomes increased more than the number of delay frames, advancing a time of reproducing the image rather than a prescribed time. To this end, there may arise problem that the synchronizing control becomes rough. Therefore, in order that the synchronizing control is fine, the I-frame may be required to be previously and finely inserted into the compression-coded data when the data is generated.

SUMMARY OF THE INVENTION

It is therefore an object of the present invention to provide an image and sound synchronizing reproduction apparatus and a method of the same regardless of the data structure of compression-coded data, capable of controlling a synchronizing reproduction finely, and realizing a smoothing reproduction without having incongruity between the image and sound even though the apparatus has a relatively low reproduction processing performance.

According to an aspect of the present invention, there is provided an image and sound synchronizing reproduction apparatus for decoding the image and sound data, each of which is coded in digital compression and reproducing those in synchronism, comprising: a reference time calculation circuit for calculating a reference time in response to a data amount of the decoded sound data; a delay detecting circuit calculating the number of image frames to be processed practically in the decoding in response to the reference time and comparing the number of image frames with the number of frames practically processed in the decoding, for detecting a delay of image decoding process; a frame-removing control circuit for performing a discriminating process of frames to be omitted the decoding process in response to the number of delay frames detected by the delay detecting circuit; and an image data input control circuit for performing an omission to read compressed image data corresponding to the frames discriminated by the frame-removing control circuit.

Also, according to the present invention, the frame-removing control circuit may perform the discrimination process for making a frame having non-key frames a frame-removed frame in priority in the case where the number of delay frames detected by the delay detecting circuit is smaller than that of the frames between the key frames to be used as a reference frame in the decoding.

According to the present invention, the frame-removing control circuit may also repeatedly perform the frame-removing process for frames, which are not the key frames, until the process reaches up to a predetermined maximum value in the case where the number of delay frames detected by the delay detecting circuit is larger than that of the frames between the key frames to be used as a reference frame in the decoding, then performs a weighted discrimination process for removing the key frames as the key frame are frame-removed frames in the case where the delay frames are not restored despite that the value already reaches to the maximum.

In addition, according to the present invention, the frame-removing control circuit may arbitrarily set the maximum value of the repeatedly frame-removing process for only the frames which are not key frames in the case where the number of the delay frames are larger than that of the frames between the key frames.

In the construction of the present invention described above, it is possible to perform the image and sound synchronizing reproduction no matter where the decoding process is not carried out in real-time because the processing performance of reproduction apparatus is insufficient.

With the discrimination process for frame-removing the B-frame in priority, the frame-removing is carried out effectively and the synchronizing reproduction can be controlled finely regardless of the structure of compressing coded data.

Also, with the performance of weighted process for key frame-removing of the I-frame and P-frame, it is possible to perform a conditional control in priority of either the recovery of delay frames or the display of output image.

BRIEF DESCRIPTION OF THE DRAWINGS

The above and other objects, advantages and features of the present invention will be more apparent from the following description taken in conjunction with the accompanying drawings in which.

DESCRIPTION OF THE PREFERRED EMBODIMENTS

Hereinafter, the preferred embodiments of the present invention will be described with reference to the accompanying drawings.

Figure 1:
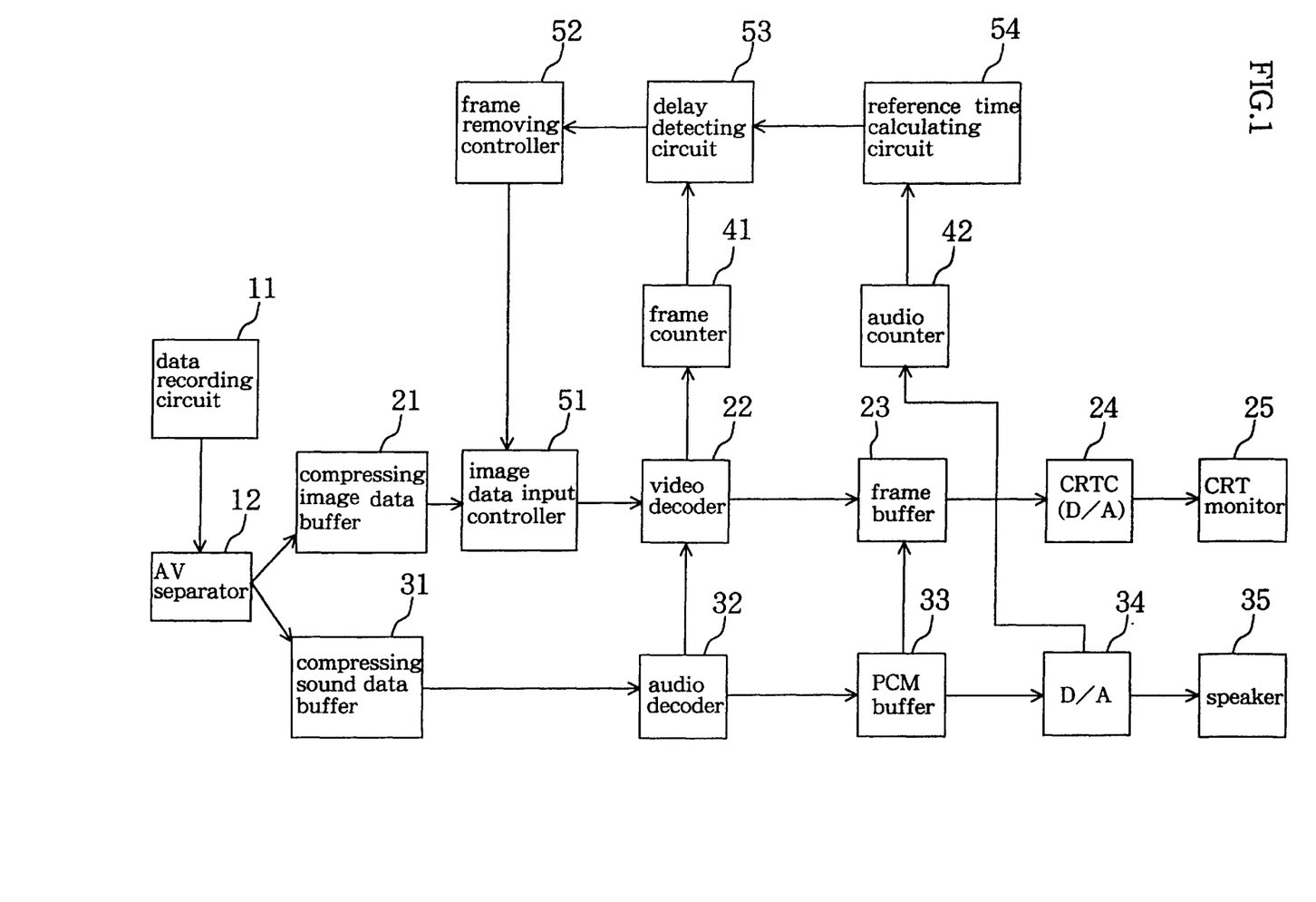
FIG. 1 is a block diagram show ing an image and sound synchronizing reproduction apparatus of the present invention.

As depicted in FIG. 1, a data recording unit 11 stores digital compression-coded data. In the synchronizing reproduction apparatus, the previously multiplexed image and sound data are separated by an AV (Audio Video) separator 12 and stored in a compressing image data buffer 21 and a compressing sound data buffer 31, respectively. The necessary image and sound data stored therein are read out from the data recording unit 11 in dependence on the progress of reproduction, as required.

The compressing image data buffer 21 outputs the image data to a video decoder 22 through an image data input controller 51 and the image data is decoded by the video decoder 22 and stored in a frame buffer 23 as a frame of decoded image data. A CRT (Cathode-Ray Tube) controller 24 (indicated by CRTC (Cathode-Ray Tube Control) in the drawing) converts the frame stored in the frame buffer 23 from the digital to analog to display on a CRT monitor 25.

The sound data is also decoded and reproduced by the order of compressing sound data buffer 31—an audio decoder 32—a PCM (Pulse Code Modulation) buffer 33—a D/A converter 34 (indicated by D/A in the drawing)—a speaker 35 similar to the image data process described above.

A frame counter 41 stores the total number of frames which have been decoded and displays the frames from the starting of reproduction to the present time.

An audio counter 42 stores the total amount of sound data which have been decoded and reproduces the sound data as PCM from the starting of reproduction to the present time.

A reference time calculating circuit 54 calculates a progressing time, after starting the reproduction, from the total amount of sound data stored in the audio counter 42.

A delay detecting circuit 53 calculates the number of frames as image data to be basically processed from a reference time calculated by the reference time calculating circuit 54, compares the number of frames with the total number of frames practically processed and stored in the frame counter 41, and discriminates whether the frame is in state of a synchronism, delay or preceding.

A frame-removing controller 52 discriminates whether a B-frame is only removed or a key frame of either an I-frame or P-frame is removed if the state of delay is discriminated by the delay detecting circuit 53.

The image data input controller 51 omits to read the corresponding compressed image data to the frame indicated by a frame-removing command from the frame-removing controller 52, and controls the image data inputted to the video decoder 22 from the compressing image data buffer 21.

Figure 2:
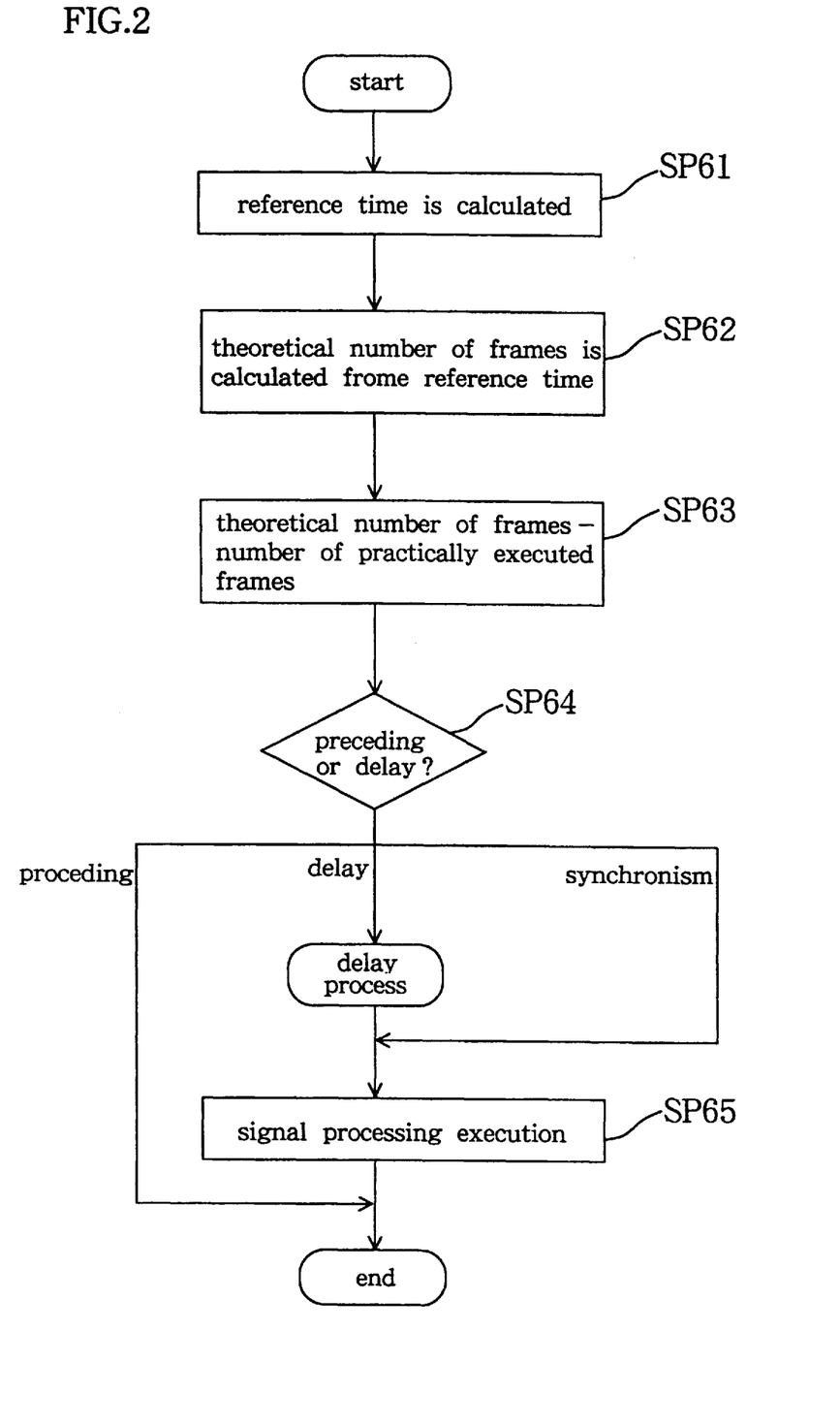
FIG. 2 is a flow chart of a delay detecting control in the image and sound synchronizing reproduction apparatus.

Referring to FIG. 2, a control method of detecting a delay in the synchronizing reproduction apparatus will be described below.

In step SP61, the progressing time (or reference time) from starting a reproduction is obtained in the reference time calculating circuit 54. In step SP62, the number of decoded frames (theoretical number) to be already processed is calculated from the reference time and a frame rate of the image data.

In step SP63, a difference value (or the number of frames) is calculated from the theoretical number obtained by the step SP62 and the number of practically executed frames which are actually decoded. Assuming that the difference value is a positive value, it indicates that the image process Ls delayed from the sound process, and a negative value, it indicates that the image process is ahead of the sound process.

Figure 4:
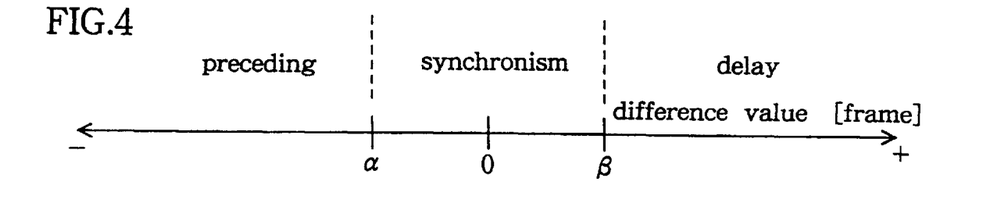
FIG. 4 is an explanatory diagram representing the number of delay and preceding frames.

As depicted in FIG. 4, the frame should be under the synchronizing state in the case where the difference value is present between t number of preceding allowable frames and t number of delaying allowable frames both previously set. This means to prevent the frame-removing control in the case of a delay state and a decoding process halt control in the case of a preceding state from an oscillation or interference.

In step SP64, the discrimination is carried out by the difference value calculated by the step SP63 and determined whether the state indicates the synchronizing, preceding or delay state.

When the difference value is the synchronizing state, the frame-removing process is not carried out, but the decoding process is carried out in step SP65.

When the difference value is the preceding state, the decoding process is not carried out, but the process is terminated and returned to the step SP61 to repeat the delay detecting control as described by the flow chart, and the decoding process is halted until the difference value becomes the synchronizing state.

When the difference value is the delay state, the frame-removing (or the decoding process is omitted) control for succeeding frames is carried out and attempted to restore the delay frame. It is noted that the number of delay frames for removing frames becomes a number subtracted the number of delay allowable frames from the difference value.

Figure 3:
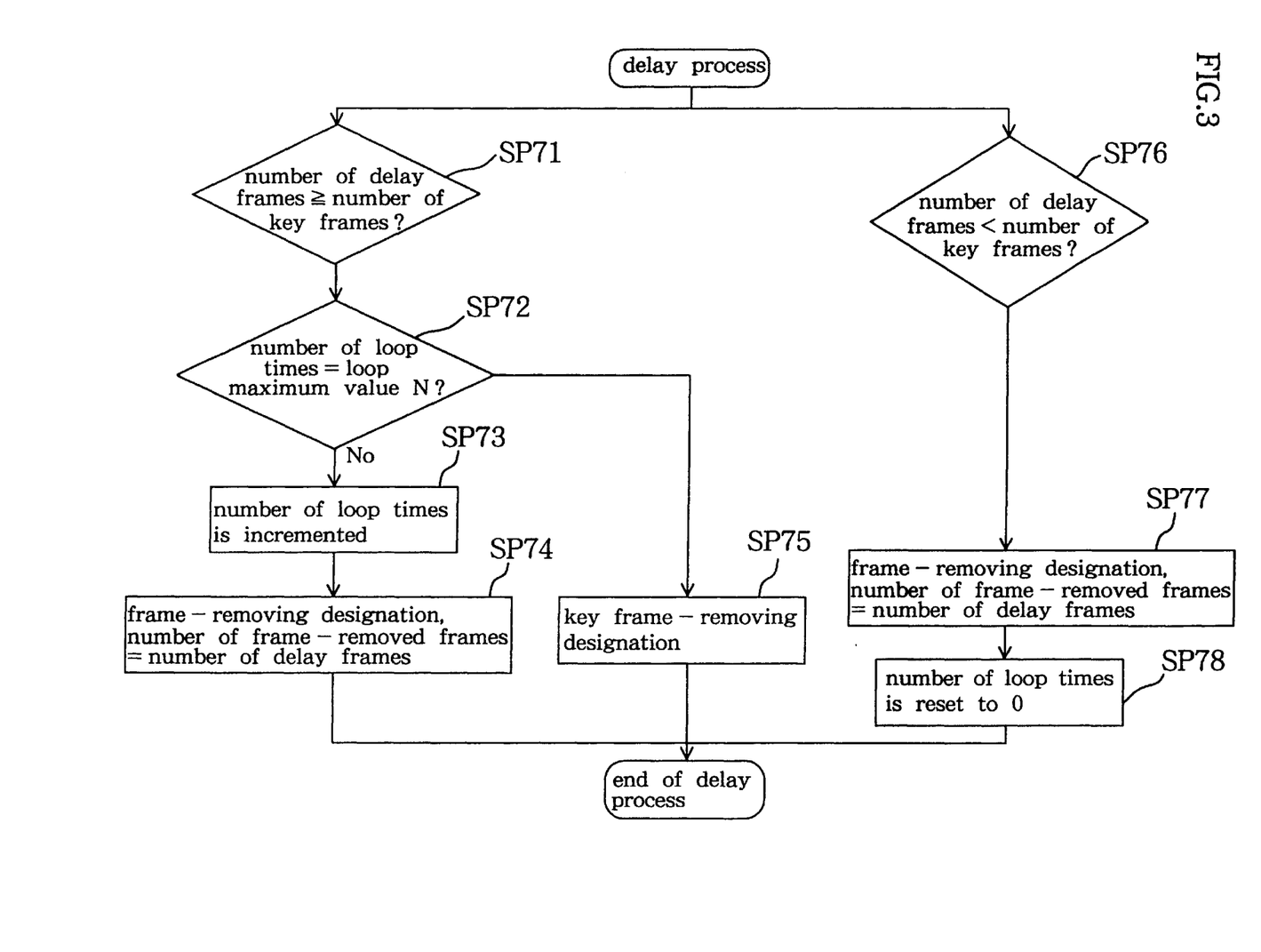
FIG. 3 is a flow chart of a frame-removing control in the image and sound synchronizing reproduction apparatus.

Referring to FIG. 3, the frame-removing control method in the synchronizing reproduction apparatus will be described below.

As depicted in FIG. 3, a case where the number of delay frames is smaller than that of frames (hereinafter, referred to as number of key frames) present between the key frames of either the I-frame or P-frame, will be described first in step SP76. In this case, the number of delay frames itself is set to the number of frame-removing frames in step SP77. The image data input control circuit 51 omits to read the compressed image data of the B-frame corresponding to the number of frame-removing frames indicated by the step SP77. Also, since the number of delay frames is less than the number of key frames, the number of times for variable loops for use in a key frame-removing judgement as described later is reset to "0" in step SP78.

A case where the number of delay frames is larger than that of key frames will be described next in step SP71. In this case, the number of delay frames itself is not set to that of frame-removing frames. This is because the same process as frame-removing process up to the following I-frame may be carried out due to removing the key frame and losing a reference frame required for the decoding process of the succeeding frame from the key frame.

Step SP72 indicates a discriminating process for the key frame-removing in which the process discriminates the following two processes: a first process is a process for setting that the key frame is not removed but the B-frame is only removed in steps SP73 and SP74; and a second process is a process for setting the key frame-removing process in step SP75.

When the number of delay frames became larger than that of key frames, the B-frame-removing process is only carried out in the steps SP73 and SP74.

In the case where the number of delay frames is not restored by the process in the steps SP73 and SP74, the process is repeated up to a loop maximum value N previously set.

In the case where the number of delay frames is not still restored even though the number of loop times is already reached to the loop maximum value N, the key frame-removing process is then carried out in the step SP75. In this case, the number of loop times is not reset, but stored as a maximum value.

This is because the key frame is removed continuously in the case where the number of delay frames is not restored despite of carrying out the key frame-removing process. With this process, the number of delay frames can be restored even though image data pattern is a data pattern having only either the I-frame or the key frames of the I-frame and P-frame.

It is noted that the maximum value N of the number of loop times is a variable for determining a weight of the key frame-removing. Therefore, the recovery of delay frames is fast when the variable is set small, but an arising frequency of key frame-removing process is high, so that displaying the image becomes clumsy. While the recovery of delay frames is slow when the variable is set large, but the arising frequency of that becomes low, so that displaying the image becomes smooth because the frame-removing process is distributed to the B-frame.

More specifically, the embodiment of the present invention will be described below.

Figure 5:
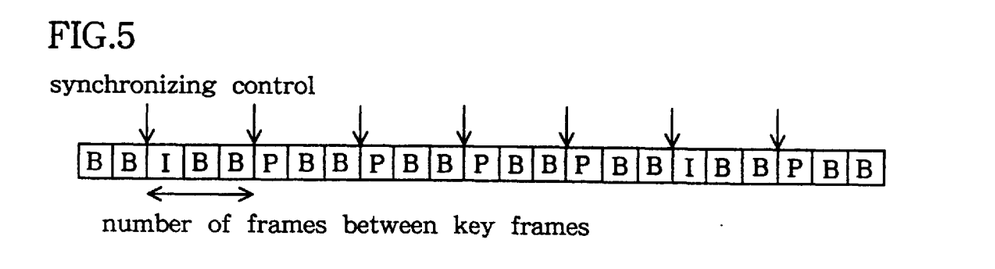
FIG. 5 is an explanatory diagram representing an example of data pattern in a compressed image data.

The synchronizing control from the reference time calculation up to the image data input control in series should be carried out immediately before carrying out the decoding process for the key frames of either the I-frame or P-frame in the embodiment, as shown the arrows indicating in the vertical direction in FIG. 5.

The number of key frames in the embodiment should also be three frames or 3 [frame] as shown in FIG. 5.

In addition, the variables for t number of preceding allowable frames, t number of delaying allowable frames and the loop maximum value N should be −3, 0 and 2, respectively in this embodiment.

While in the case where a PCM data format has a sampling rate of 44.1 kHz in a stereo signal and a bit accuracy of 16 bits per one sample, for example, a reference time calculated from the total amount of data stored in the audio counter 42 shown in FIG. 1 is represented by the following expression (1).

$$\text{reference time [sec]} = \text{total amount of data [Bytes]}/(44.1 \times 1000 \times 16/8 \times 2) \quad (1)$$

In the case where the image data format also has 30 frame/sec of frame rate, for example, the number of image frames (the theoretical number of frames) to be processed basically is represented by the following expression (2).

the theoretical number of frames [frame]=(reference time+T)×30(2)

As depicted in the expression (2), time T added to the reference time is a shifted time between the display time of the first image frame originally present in the compression coded data and the output time of the first sound sample.

The theoretical number of frames calculated by the expression (2) and the operations of the synchronizing control and the frame-removing control in response to the number of practically executed frames, as actually carried out the decoding process, stored in the frame counter 41 (FIG. 1) will explained with reference to FIGS. 6 to 11 below. As shown in the drawings, the portions of coarse shaded lines represent the frames to be processed the decoding and those of the fine shaded lines represent the frames to be processed the frame-removing.

Figure 6:
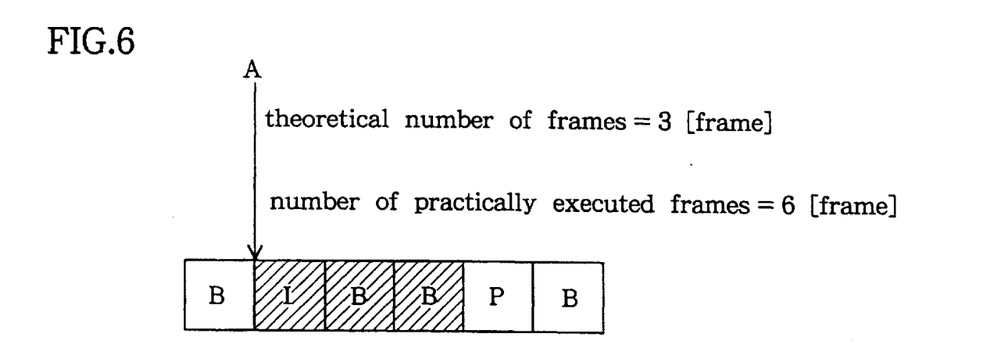
FIG. 6 is an explanatory diagram representing an embodiment of a synchronous control in the image and sound synchronizing reproduction apparatus of the present invention.

FIG. 6 shows a case where the theoretical number of frames is three or 3 [frame] and the number of practically executed frames is six or 6 [frame] at a synchronizing control point A. In this case, the difference value becomes −3 which is present in the preceding allowable range, so that the difference value becomes the synchronizing state. Thus, the decoding process is carried out up to the following key frame without the frame-removing.

Figure 7:
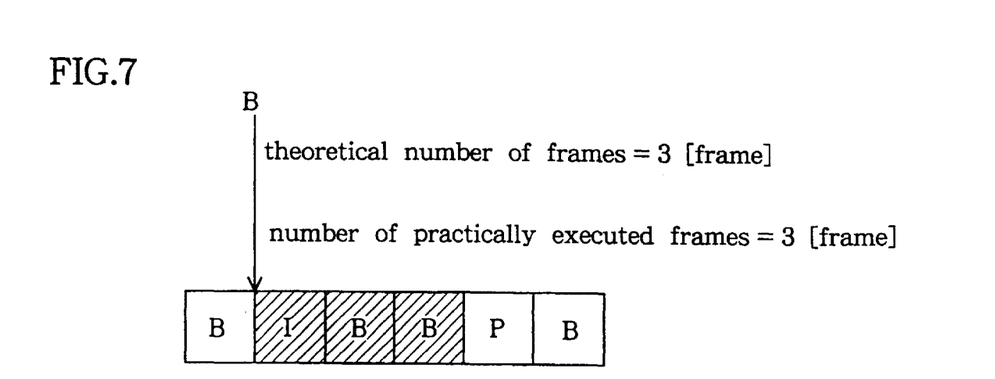
FIG. 7 is an explanatory diagram representing another embodiment of the synchronous control.

FIG. 7 shows another case where the theoretical number of frames is three or 3 [frame] and the number of practically executed frames is three or 3 [frame] at a synchronizing control point B. In this case, the difference value becomes 0 which is present in the delay allowable range, so that the difference value becomes the synchronizing state. Thus, the decoding process is carried out up to the following key frame without the frame-removing.

Figure 8:
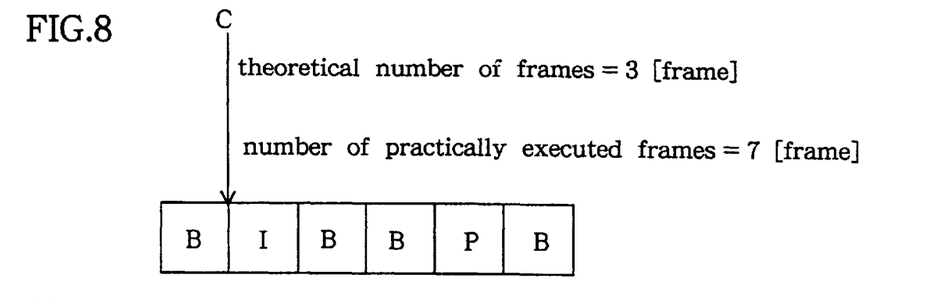
FIG. 8 is an explanatory diagram representing another embodiment of the synchronous control.

FIG. 8 shows another case where the theoretical number of frames is three or 3 [frame] and the number of practically executed frames is seven or 7 [frame] at a synchronizing control point C. In this case, the difference value becomes −4 which exceeds the preceding allowable range, so that the difference value becomes the preceding state. Therefore, the decoding process is halted until the difference value becomes the synchronizing state.

Figure 9:
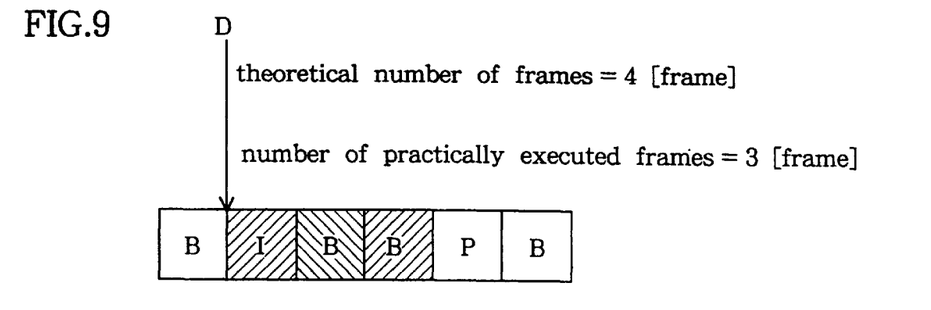
FIG. 9 is an explanatory diagram representing another embodiment of the synchronous control.

FIG. 9 shows another case where the theoretical number of frames is four or 4 [frame] and the number of practically executed frames is three or 3 [frame] at a synchronizing control point D. In this case, the difference value becomes +1 which exceeds the delay allowable range, so that the difference value becomes the delay state and the frame-removing control is carried out. The number of delay frames is then one frame which is present in the number of key frames, therefore, one B-frame is frame-removed and the rest of two B-frames are decoded.

Figure 10:
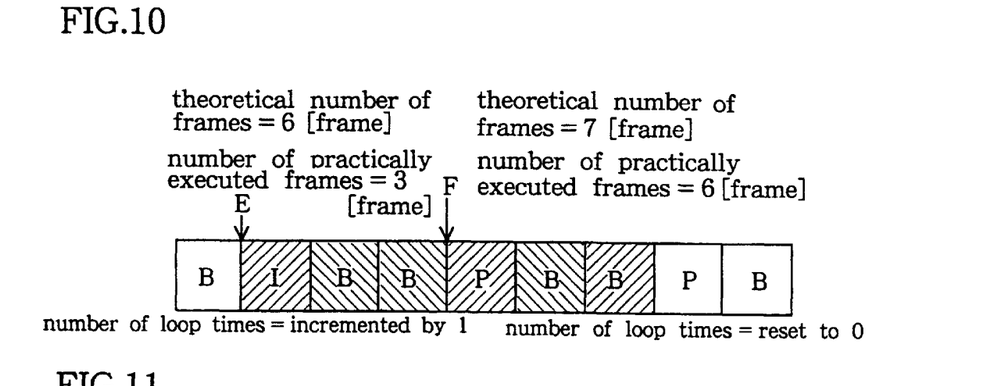
FIG. 10 is an explanatory diagram representing another embodiment of the synchronous control.

FIG. 10 shows another case where the theoretical number of frames is six or 6 [frame] and the number of practically executed frames is three or 3 [frame] at a synchronizing control point E. In this case, the difference value becomes +3 which exceeds the delay allowable range and the number of delay frames is 3 which is over the number of key frames, therefore, the key frame-removing discrimination control is carried out. In addition, the number of loop times is 0 at a synchronizing control point E, therefore, the key frames are decoded and two B-frames are removed, then the number of loop times is incremented by 1.

At a synchronizing control point F following the control point E, the theoretical number of frames is seven or 7 [frame] and the number of practically executed frames is six or 6 [frame]. The number of delay frames becomes 1 thereby the number thereof is restored to the extent that it is present in the number of key frames. Thus, one B-frame is removed and the rest of two frames are decoded at the synchronizing control point F, and the number of loop times is then reset to 0.

Figure 11:
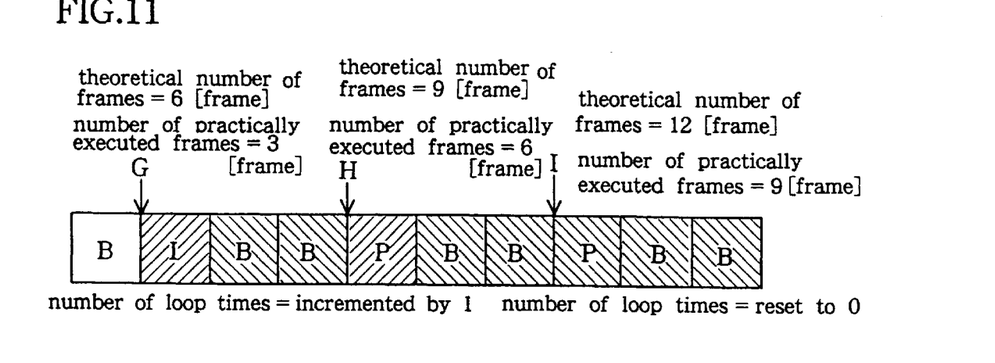
FIG. 11 is an explanatory diagram representing another embodiment of the synchronous control.

FIG. 11 shows a case where the theoretical number of frames is six or 6 [frame] and the number of practically executed frames is three or 3 [frame] at a synchronizing control point G. In this case, the difference value becomes +3 which exceeds the delay allowable range and the number of delay frames is 3 which is over the number of key frames, therefore, the key frame-removing discrimination control is carried out. Also, the number of loop times is 0 at the synchronizing control point G, therefore, the key frames are decoded and two B-frames are removed, then the number of loop times is incremented by 1.

At a synchronizing control point H following the control point G, the theoretical number of frames is nine or 9 [frame] and the number of practically executed frames is six or 6 [frame] To this end, the number of delay frames is 3 which is still over the number of key frames. Also, the number of loop times is 1 at the synchronizing control point H, which is smaller than the loop maximum value.

Therefore, the key frames are decoded at the synchronizing control point H as well as the control point G and two B-frames are removed, then the number of loop times is incremented by 2.

At a synchronizing control point I following the control point H, the theoretical number of frames is twelve or 12 [frame] and the number of practically executed frames nine or 9 [frame] and the number of delay frames is 3 which is still over the number of key frames. Now, the number of loop times is 2 at the synchronizing control point I, which is equal to the loop maximum value. Thus, the key frame-removing is then carried out.

As described above, the embodiment has be explained the cases where the number of key frames for the compressed image data is three or 3 [frame] and where the variables of t number of preceding allowable frames, t number of delay allowable frames and the loop maximum value N are −3, 0 and 2, respectively, but it will also be explained the cases where the format of compressed image data is different and where the variables are substituted for others as well.

It is thus apparent that the present invention is not limited to the above embodiments but may be changed and modified without departing from the scope and spirit of the invention.

Finally, the present application claims the priority of Japanese Patent Application No. Hei-9-003851 filed Jan. 13, 1997, which is herein incorporated by reference.

What is claimed is:

1. An image and sound synchronizing reproduction apparatus for decoding image and sound data both coded in digital compression and reproducing the image and sound data in synchronism, comprising:

a reference time calculation circuit for calculating a reference time in response to a data amount of decoded sound data;

a delay detecting circuit for calculating a number of image frames to be processed practically in a decoding process of the image data in response to the reference time and comparing the number of image frames to be practically processed with a number of frames practically processed in the decoding process of the image data, for detecting a number of delay frames of the decoding process of the image data;

a frame-removing control circuit for performing a discriminating process of frames to be omitted from the decoding process of the image data in response to the number of delay frames detected by the delay detecting circuit; and an image data input control circuit for omitting the reading of compressed image data corresponding to the frames discriminated by the frame-removing control circuit.

2. A synchronizing reproduction apparatus according to claim 1, wherein the frame-removing control circuit performs the discrimination process for making a frame having non-key frames a frame-removed frame in priority in a case where the number of delay frames detected by the delay detecting circuit is smaller than a number of frames between the key frames to be used as a reference frame in the decoding process.

3. A synchronizing reproduction apparatus according to claim 2, wherein the frame-removing control circuit repeatedly performs a frame-removing process for frames which are not the key frames, until the process reaches up to a predetermined maximum value in a case where the number of delay frames detected by the delay detecting circuit is larger than the number of frames between the key frames to be used as the reference frame in the decoding process of the image data, then performs a weighted discrimination process for removing the key frames as the key frames are frame-removed frames in a case where the delay frames are not restored even when the value has already reached to the maximum.

4. A synchronizing reproduction apparatus according to claim 3, wherein the frame-removing control circuit arbitrarily sets the maximum value of the repeatedly frame-removing process for only the frames which are not key frames in a case where the number of the delay frames are larger than the number of frames between the key frames.

5. An image and sound synchronizing reproduction apparatus for decoding image and sound data both coded in digital compression and reproducing the image and sound data in synchronism, comprising:

an image and sound separating circuit for separating the image and sound data both coded in the digital compression;

a sound decode processing circuit for performing a decoding process of the separated sound data and holding decoded sound data;

an image decode processing circuit for performing a decoding process of the separated image data and holding a frame of decoded image data;

a reference time calculation circuit for calculating a reference time in response to an amount of the decoded sound data;

a delay detecting circuit for calculating a number of image frames to be processed practically in the decoding process of the separated image data in response to the reference time and comparing the number of image frames to be practically processed with the number of frames practically processed in the decoding process of the separated image data, for detecting a number of delay frames of the decoding process of the separated image data;

a frame-removing control circuit for performing a discriminating process of frames to be omitted from the decoding process of the separated image data in response to the number of delay frames detected by the delay detecting circuit; and an image data input control circuit for omitting the reading of compressed image data corresponding to the frames discriminated by the frame-removing control circuit.

6. A synchronizing reproduction apparatus according to claim 5, wherein the image and sound separating circuit includes a compressed sound data buffer for temporarily holding the separated sound data.

7. A synchronizing reproduction apparatus according to claim 5, wherein the image and sound separating circuit includes a compressed image data buffer for temporarily holding the separated image data.

8. A synchronizing reproduction apparatus according to claim 5, wherein the sound decode processing circuit includes a sound decoder for decoding the separated sound data.

9. A synchronizing reproduction apparatus according to claim 8, wherein the sound decode processing circuit includes an audio counter for holding a total amount of the decoded sound data.

10. A synchronizing reproduction apparatus according to claim 8, wherein the sound decode processing circuit includes a sound decoded data buffer for temporarily holding the decoded sound data outputted from the sound decoder.

11. A synchronizing reproduction apparatus according to claim 10, wherein the sound decoded data buffer is connected to a digital to analog converter to output the sound data to the audio counter and a speaker, respectively.

12. A synchronizing reproduction apparatus according to claim 5, wherein the image decode processing circuit includes an image decoder for decoding the separated image data.

13. A synchronizing reproduction apparatus according to claim 12, wherein the image decode processing circuit includes a frame counter for holding a total number of the frames of the decoded image data.

14. A synchronizing reproduction apparatus according to claim 12, wherein the image decode processing circuit includes an image frame buffer for temporarily holding the frame of decoded image data outputted from the image decoder.

15. A synchronizing reproduction apparatus according to claim 14, wherein the image frame buffer is connected to a digital to analog converter to output the frame of image data to a display.

16. A synchronizing reproduction method of decoding image and sound data both coded in digital compression, comprising the steps of:

(a) separating image and sound data both coded in the digital compression;

(b) performing a decoding process of the separated sound data and holding decoded sound data;

(c) performing a decoding process of the separated image data and holding a frame of decoded image data;

(d) calculating a reference time in response to an amount of the decoded sound data;

(e) calculating a number of image frames to be processed practically in the decoding process of the separated image data in response to the reference time and comparing the number of image frames to be practically processed with the number of frames practically processed in the decoding process of the separated image data, for detecting a number of delay frames of the decoding process of the separated image data;

(f) performing a discriminating process of frames to be omitted from the decoding process of the separated image data in response to the number of delay frames detected in the step (e); and (g) omitting the reading of compressed image data corresponding to the frames discriminated in the step (f).

17. A synchronizing reproduction method according to claim 16, wherein the step (f) performs the discrimination process for making a frame having non-key frames a frame-removed frame in priority in a case where the number of delay frames detected by the delay detecting circuit is smaller than a number of frames between the key frames to be used as a reference frame in the decoding process of the separated image data.

18. A synchronizing reproduction method according to claim 16, wherein the step (f) repeatedly performs a frame-removing process for frames which are not the key frames, until the process reaches up to a predetermined maximum value in a case where the number of delay frames detected in the step (f) is larger than the number of frames between the key frames to be used as the reference frame in the decoding process of the image data, then performs a weighted discrimination process for removing the key frames as the key frames are frame-removed frames in a case where the delay frames are not restored even when the value has already reached to the maximum.

19. A synchronizing reproduction method according to claim 16, wherein the step (f) arbitrarily sets the maximum value of the repeatedly frame-removing process for only the frames which are not key frames in a case where the number of the delay frames are larger than the number of frames between the key frames.

20. A synchronizing reproduction method according to claim 16, wherein the step (e) calculates the number of frames of the image data to be processed in the decoding process of the separated image data in response to the reference time, compares the number of frames with the total number of frames processed practically, and performs the discrimination of one of synchronism, delay and preceding of the image decoding process.

* * * * *